United States Patent Office 3,301,879
Patented Jan. 31, 1967

3,301,879
19-NOR-ANDROSTENES
Albert Wettstein, Riehen, and Georg Anner, Peter Wieland, and Karl Heusler, Basel, Switzerland, assignors to Ciba Corporation, New York, N.Y., a corporation of Delaware
No Drawing. Filed Nov. 19, 1963, Ser. No. 324,854
Claims priority, application Switzerland, Nov. 23, 1962, 13,777/62; Jan. 25, 1963, 933/63; June 26, 1963, 7,923/63
5 Claims. (Cl. 260—397.5)

The present invention relates to the manufacture of new 19-norandrostenes of the formula (I)
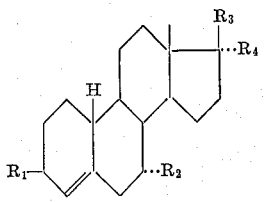

in which $R_1$ and $R_3$ each represents a free, esterified or etherified hydroxyl group, $R_2$ a lower alkyl group, more especially a methyl or ethyl group, and $R_4$ stands for a hydrogen atom or a lower saturated or unsaturated, unsubstituted or halogenated aliphatic hydrocarbon radical.

An esterified hydroxyl group is, above all, the acid radical of an aliphatic, alicyclic, araliphatic or aromatic carboxylic acid containing at most 20 carbon atoms, for example the radical of formic, methylcarbonic, acetic, trifluoracetic, trimethylacetic, propionic, caproic, decanoic, undecylenic, hexahydrobenzoic, cyclopentylpropionic, phenylpropionic, benzoic or furoic acid.

An etherified hydroxyl group is more especially the tetrahydropyranyloxy group, or a lower α-alkoxy-alkoxy, α-alkoxy-cycloalkoxy, α-alkenyloxy, α-cycloalkenyloxy or α-hydroxy- or α-alkanoyloxy-β-halogenalkoxy group, for example a 2-ethoxy-propoxy-(2), 2-methoxy-butoxy-(2), methoxy-methoxy, α-methoxy-ethoxy, α-methoxy-cyclopentoxy, or lower alkoxy, e.g., methoxy, ethoxy, propoxy, etc. The term lower refers to hydrocarbon radicals having up to 7 carbon atoms.

Suitable lower, saturated or unsaturated aliphatic, unsubstituted or halogenated hydrocarbon radicals are, for example, lower alkyl, such as methyl, ethyl, propyl or isopropyl groups; lower alkenyl, such as vinyl, allyl or methallyl radicals; or lower alkinyl, such as ethinyl or propinyl, groups; or the corresponding halogenated radicals such, for example, as the trifluoromethylethinyl group. The term "lower," as used above or hereinafter with reference to hydrocarbon radicals designates such radicals containing at most 7 chain carbon atoms.

The new 19-nor-androstenes possess valuable pharmacological properties. Inter alia they display in test animals anabolic-androgenic activity with a particularly high ratio of the anabolic to the androgenic effect. This enables them to be used as anabolic agents. A particularly high anabolic action is found in those compounds of the Formula I in which $R_1$ and $R_3$ each represents a free or esterified hydroxyl group, $R_4$ a hydrogen atom or a methyl or ethyl group and $R_2$ stands for a methyl group. Moreover, the compounds, and especially those which have an unsaturated hydrocarbon radical in 17α-position, those for instance in which $R_4$ is an ethinyl group, have antigonadotropic, gestagenic and anti-hypercholesterinemic action.

The new compounds can be prepared by known methods, advantageously by reducing an androstene of the formula (II)
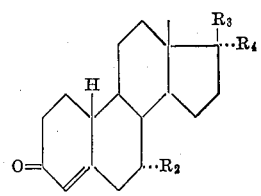

in which $R_2$ to $R_4$ each has the above meaning, and $R_3$ and $R_4$ together may also form an oxo group, with a complex light metal hydride and, if desired, esterifying or etherifying free hydroxy groups in the resulting compound.

As examples of suitable complex light metal hydrides there may be mentioned: Boron or aluminum hydrides of alkali or alkaline earth metals, such as lithium, sodium, potassium or calcium-borohydrides, or more especially lithium aluminum hydride, or alkali metal trilower alkoxy boron or aluminum hydrides, such as sodium trimethoxy borohydride or lithium tri-tertiary butoxy aluminum hydride.

The reduction is advantageously performed in an organic solvent, more especially in an open-chain or cyclic ether, such as diethyl ether, glycol dimethyl ether, a polyglycol ether, tetrahydrofuran or dioxane. When a borohydride, for example sodium borohydride, is used, the solvent employed may also be an alcohol, such as methanol, ethanol or propanol.

The 3-hydroxy group resulting from the reduction according to the invention—if desired together with a free 17β-hydroxy group—can be esterified or etherified by known methods. Esters are obtained, for example, by reaction with reactive functional derivatives of the aforementioned acids, more especially their anhydrides or halides. For the manufacture of the tetrahydropyranyl ethers there is used, e.g., dihydropyran in the presence of an acid catalyst, such as para-toluenesulfonic acid, phosphorus oxychloride or pyridine hydrochloride. When 17β-hydroxy compounds are reacted with ketals or acetals, more especially dimethyl or diethyl ketals or acetals of simple ketones, such as acetone, methylethyl ketone, cyclopentanone or cyclohexanone, or of aldehydes such as acetaldehyde or propionaldehyde, there are obtained by reacetalisation mixed ketals or acetals respectively which, on heating, give off alcohol and are transformed into enol ethers. When a 17-hydroxy compound is treated with chloral, a hemiacetal forms, the free hydroxy group of which may be esterified, for example acetylated or propionylated, in the known manner.

Depending on the activity of the hydride used a possibly present esterified 17β-hydroxy group is converted into a free hydroxy group or it remains intact; the latter is the case, for instance, when sodium borohydride or lithium tri-tertiary butoxy aluminum hydride is used. Thus, by subsequent esterification or etherification of the 3-hydroxy group formed it is possible to manufacture compounds in which the esterified or etherified hydroxy groups in positions 3 and 17 are different.

The compounds of the Formula II used as starting materials can be prepared in known manner from corresponding $\Delta^{4,6}$-3-ketoandrostadiene unsubstituted in position 7 by adding on an alkylmagnesium halide in the presence of a copper salt.

The new androstenes of the Formula I may be used as medicaments, for example in the form of pharmaceutical preparations containing them in admixture with an organic or inorganic, solid or liquid pharmaceutical excipient suitable for enteral or parenteral administration. Suitable excipients are substances that do not react with the new compounds, for example water, gelatine, lactose, starches, stearyl alcohol, magnesium stearate, talcum, vegetable oils, benzyl alcohols, gums propyleneglycol, polyalkyleneglycols, cholesterol or other known medicinal excipients. The pharmaceutical preparations may be, for example, tablets, dragees or capsules, or in liquid form solutions, suspensions or emulsions. They may be sterilized and/or contain assistants such as preserving, stabilizing, wetting or emulsifying agents, solution promoters, salts for regulating the osmotic pressure or buffers. They may also contain further therapeutically valuable substances. The content of the active ingredient in these pharmaceutical compositions is preferably within the range of 0.03 to 50% by weight or of 0.001 mg. to 50 mg. per unit dose. The pharmaceutical preparations are formulated by known methods.

The following examples illustrate the invention.

EXAMPLE 1

While cooling with ice and stirring under nitrogen, 3 g. of $\Delta^4$-3-oxo-7$\alpha$:17$\alpha$-dimethyl-17$\beta$-hydroxy-19-nor-androstene are added to a mixture of 4 g. of lithium tritertiary butoxy aluminum hydride and 30 ml. of absolute tetrahydrofuran, while rinsing with 6 ml. of tetrahydrofuran. After 5 hours and 20 minutes 1 g. of lithium tritertiary butoxy aluminum hydride is added, and the batch is stirred for another 3½ hours at room temperature, whereupon 50 ml. of saturated Seignette salt solution and then 2 ml. of glacial acetic acid are slowly added. On the following day the mixture is extracted 3 times with methylene chloride; the organic solutions are then washed twice with water, dried and evaporated under a water jet vacuum. The residue is chromatographed on 150 g. of silica gel containing 15% of water. The fractions eluted with benzene+ethyl acetate mixtures 9:1 and 4:1 are recrystallized from methylene chloride+ether and yield 2.29 g. of $\Delta^4$-3$\beta$:17$\beta$-dihydroxy-7$\alpha$:17$\alpha$-dimethyl-19-norandrostene which, after further recrystallization, melts at 91.5° C.–93.5° C. Optical rotation $[\alpha]_D^{25} = -10°$ (c.=1.103 in chloroform). Infrared spectrum (solvent: methylene chloride): 2.75 and 2.88$\mu$ (hydroxy) and 6.00$\mu$ (double bond).

On acetylation with pyridine and acetic anhydride at room temperature overnight $\Delta^4$-3:17$\beta$-dihydroxy-7$\alpha$:17$\alpha$-dimethyl - 19 - norandrostene yields $\Delta^4$-3-acetoxy-17$\beta$-hydroxy-7$\alpha$:17$\alpha$-dimethyl-19-norandrostene.

Esterification with propionic anhydride or phenylpropionyl chloride yields $\Delta^4$-3-propionyloxy- or -3-phenylpropionyloxy - 17$\beta$ - hydroxy-7$\alpha$:17$\alpha$-dimethyl-19-norandrostene.

EXAMPLE 2

A solution of 1.5 g. of $\Delta^4$-3-oxo-17$\beta$-acetoxy-7$\alpha$-methyl-19-norandrostene in 50 ml. of tetrahydrofuran is stirred into an ice-cold suspension of 2.0 g. of lithium aluminum hydride in 20 ml. of tetrahydrofuran; the mixture is stirred for 30 minutes at room temperature and then stirred and heated at the boil for 30 minutes. Finally, the excess reactant is decomposed by adding a mixture of 10 ml. of ethyl acetate and 20 ml. of tetrahydrofuran; 5 ml. of saturated sodium sulfate solution are run in, 5 g. of anhydrous sodium sulfate are added, and the whole is filtered. The filter residue is thoroughly washed with tetrahydrofuran and the filtrate is evaporated in a water jet vacuum, to yield 1.42 g. of crude crystalline $\Delta^4$-3:17-dihydroxy-7$\alpha$-methyl-19-norandrostene.

Esterification with pyridine and propionic anhydride gives rise to $\Delta^4$-3:17-dipropionyloxy-7$\alpha$-methyl-19-norandrostene which is purified by crystallization from methanol.

EXAMPLE 3

4 grams of $\Delta^4$-3-oxo-7$\alpha$-methyl-17$\alpha$-ethinyl-17$\beta$-hydroxy-19-norandrostene are added to 6 grams of lithium tritertiary-butoxy-aluminum hydride and 40 ml. of tetrahydrofuran while stirring and cooling with ice, and the whole is stirred for 1½ hours while cooling with ice and for 4 hours at room temperature. 60 ml. of saturated Rochelle salt solution are added with cooling and then 2.4 ml. of glacial acetic acid. After the batch has been extracted three times with methylene chloride, the organic phases are washed with water, dried and evaporated in vacuo. The residue is chromatographed on 200 grams of Florisil, $\Delta^4$-3:17$\beta$-dihydroxy-7$\alpha$-methyl-17$\alpha$-ethinyl-19-norandrostene being eluted with a mixture of benzene+ethyl acetate (19:1). For the purpose of acetylation the product is dissolved in 30 ml. of pyridine and 30 ml. of acetic anhydride, heated in a current of nitrogen for 1 hour at 50° C. and then boiled under reflux for 2 hours. The batch is then evaporated at a water-jet vacuum, dissolved in xylene, evaporated again at a water-jet vacuum, this operation being repeated once more with benzene. The residue is chromatographed on 150 grams of Florisil, $\Delta^4$-3:17$\beta$-diacetoxy-7$\alpha$-methyl-17$\alpha$-ethinyl-19-norandrostene being eluted with benzene. After recrystallization from a mixture of ether and petroleum ether 1.35 grams melting at 146.5–148° C. are obtained. By evaporating the mother liquor another 400 mg. of the same compound can be obtained. IR-spectrum (in methylene chloride)=3.03$\mu$, 5.73$\mu$, 5.77$\mu$, 5.99$\mu$ and 8.14$\mu$.

EXAMPLE 4

3 g. $\Delta^4$-3$\beta$, 17$\beta$-dihydroxy-7$\alpha$,17$\alpha$ - dimethyl - 19 - norandrostene are kept overnight at $-10°$ C. in a mixture of 15 ml. of pyridine and 15 ml. of acetanhydride. The reaction mixture is hereupon poured in 300 ml. of ice-water and, after stirring for half an hour, it is extracted three times with methylene chloride. The organic solution is then washed consecutively with dilute hydrochloric acid, sodium bicarbonate solution and water, then dried and evaporated in a vacuum. The residue is chromatographed over 150 g. of silica gel which contains 15% of water, and the fractions eluted with a mixture of benzene and ethyl acetate (19:1) are combined, dissolved in benzene and filtered through a column of 10 g. of alumina of activity II. The filtrate (200 ml.) is evaporated and the residue is dried in a high vacuum at 50° C. There are so obtained 2 g. of a product in the form of a colorless foam which is, according to its thin layer chromatogram made on silica gel in the systems chloroform-acetone (95:5) and benzenechloroform (1:1) pure $\Delta^4$-3$\beta$-acetoxy-7$\alpha$,17$\alpha$-dimethyl-17$\beta$-hydroxy-19-nor-androstene. $[\alpha]_D^{20} = -53°$ (c.=0.855 in chloroform). IR-spectrum (methylene chloride, 2.75$\mu$, 5.77$\mu$, 5.99$\mu$ and 8.08$\mu$.

EXAMPLE 5

A solution of 3 g. of $\Delta^4$-3$\beta$,17$\beta$-dihydroxy-7$\alpha$-17$\alpha$-dimethyl-19-nor-androstene in 30 ml. pyridine and 30 ml. of acetanhydride is refluxed for four hours in an atmosphere of nitrogen. The solution is then evaporated under reduced pressure, benzene is added to the residue and the solution is again evaporated under reduced pressure. The residue is then chromatographed over 150 g. of silica-gel which contains 15% water. From the fractions eluted with benzene there is obtained a product which after recrystallization from methanol containing water yields 1.56 g. of $\Delta^4$-3$\beta$-diacetoxy-7$\alpha$,17$\alpha$ dimethyl-19-nor-androstene melting at 112.5–113.5° C. $[\alpha]_D^{20} = -41°$ (c.=0.988 in chloroform). IR-spectrum (methylene chloride) 5.79$\mu$, 6.00$\mu$ and 8.08$\mu$.

EXAMPLE 6

1000 tablets each containing 1.0 mg. of active principle are manufactured with the following ingredients:

| | Grams |
|---|---|
| $\Delta^4$-3$\beta$,17$\beta$-dihydroxy - 7$\alpha$,17$\alpha$ - dimethyl - 19 - norandrostene | 1.0 |
| Lactose | 55.0 |
| Colloidal silica with hydrolysed starch | 5.0 |

|   | Grams |
|---|---|
| Wheat starch | 22.0 |
| Arrowroot | 12.0 |
| Magnesium stearate | 0.7 |
| Talcum | 4.3 |
|   | 100.0 |

*Preparation*

The active principle together with lactose is mixed to form a homogeneous powder which is worked in a kneading machine with silica, wheat starch and water to form a uniformly moist, slightly plastic paste which is dried and granulated. The granulate thus obtained is mixed with arrowroot, magnesium stearate and talcum and the initimately mixed material is made into 1000 tablets of 100 mg. weight each.

EXAMPLE 7

100 ampoules, each containing 10 mg. of active principle are made from the following ingredients:

| $\Delta^4$-3$\beta$,17$\beta$-dihydroxy - 7$\alpha$,17$\alpha$ - dimethyl - 19 - nor-androstene | g | 1 |
|---|---|---|
| Neutral sterilized sesame oil to make | ml | 100 |

*Preparation*

A 100 ml. flask is charged with 1 gram of the active active principle, 5 ml. of pure acetone are added, the whole is intimately mixed and the acetone evaporated. The residue is dissolved in aproximately 50 ml. of sesame oil purified by being kept for two hours at 180° C. The solution is then made up with more sesame oil to 100 ml. filtered through a sterilized, coarsely porous glass sinter filter and 1 ml. each is charged into suitable ampoules which are then sealed.

EXAMPLE 8

1000 tablets each containing 0.1 mg. of active principle are manufactured with the following ingredients:

|   | Grams |
|---|---|
| $\Delta^4$-3$\beta$,17$\beta$-dihydroxy-7$\alpha$-methyl - 17$\alpha$ - ethinyl - 19-nor-androstene | 0.1 |
| Lactose | 50.0 |
| Colloidal silica gel with hydrolysed starch | 5.0 |
| Wheat starch | 20.9 |
| Arrowroot | 9.0 |
| Magnesium stearate | 0.7 |
| Talcum | 4.3 |
|   | 90.0 |

They are prepared as described in Example 6.

What is claimed is:

1. A 19-nor-androstene of the formula

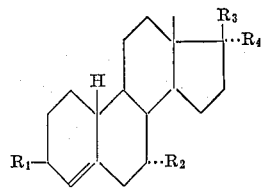

in which $R_1$ and $R_3$ each represents a member selected from the group consisting of a free, an esterified and an etherified hydroxyl group, $R_2$ represents a lower alkyl group and $R_4$ stands for a member selected from the group consisting of hydrogen, lower alkenyl, lower alkinyl, halogenated lower alkenyl and halogenated lower alkinyl, and $R_3$ and $R_4$ taken together represent oxygen, the above esterified hydroxyl groups being derived from carboxylic acids having at most 20 carbon atoms and said ether groups being members selected from the group consisting of hydrocarbon and halogenated hydrocarbon except for the ether oxygen linkages.

2. $\Delta^4$-3:17$\beta$-dihydroxy-7$\alpha$-methyl-17$\alpha$-ethinyl - 19 - nor-androstene.

3. $\Delta^4$-3:17$\beta$-diacetoxy-7$\alpha$-methyl-17$\alpha$-ethinyl - 19 - nor-androstene.

4. $\Delta^4$-3:17-dihydroxy-7$\alpha$-methyl-19-nor-androstene.

5. $\Delta^4$-3:17$\beta$-dipropionyloxy-7$\alpha$-methyl 19 - nor - androstene.

References Cited by the Examiner

UNITED STATES PATENTS

| 3,068,249 | 12/1962 | Colton | 260—397.5 |
| 3,176,013 | 3/1965 | Klimstra | 260—239.55 |

LEWIS GOTTS, *Primary Examiner.*

ELBERT L. ROBERTS, *Examiner.*

UNITED STATES PATENT OFFICE
CERTIFICATE OF CORRECTION

Patent No. 3,301,879                                  January 31, 1967

Albert Wettstein et al.

It is hereby certified that error appears in the above numbered patent requiring correction and that the said Letters Patent should read as corrected below.

Column 4, line 49, for "chloride," read -- chloride), --; line 63, for "$\Delta^4$-3$\beta$-diacetoxy-7$\alpha$,17$\alpha$ dimethyl-19-nor-androstene" read -- $\Delta^4$-3$\beta$, 17$\beta$-diacetoxy-7$\alpha$, 17$\alpha$-dimethyl-19-nor-androstene --; column 5, line 27, strike out "active".

Signed and sealed this 26th day of November 1968.

(SEAL)
Attest:

Edward M. Fletcher, Jr.                            EDWARD J. BRENNER

Attesting Officer                                         Commissioner of Patents

Disclaimer 3,301,879.—*Albert Wettstein*, Riehen, and *Georg Anner, Peter Wieland*, and *Karl Heusler*, Basel, Switzerland. 19-NOR-ANDROSTENES. Patent dated Jan. 31, 1967. Disclaimer filed July 11, 1973, by the assignee, *Ciba Corporation*.

Hereby enters this disclaimer to claims 1–4 of said patent.

[*Official Gazette November 13, 1973.*]